(12) United States Patent
Berghammer (10) Patent No.: US 10,052,995 B2
(45) Date of Patent: Aug. 21, 2018

(54) TRAILER-TRAIN TRAILER WITH CARRYING FRAME FOR A MATERIAL TRANSPORT CART

(71) Applicant: LR Intralogistik GmbH, Woerth an der Isar (DE)

(72) Inventor: Fritz Berghammer, Landshut (DE)

(73) Assignee: LR Intralogistik GmbH, Woerth an der Isar (DE)

( * ) Notice: Subject to any disclaimer, the term of this patent is extended or adjusted under 35 U.S.C. 154(b) by 0 days.

(21) Appl. No.: 15/277,374

(22) PCT Filed: Dec. 19, 2014

(86) PCT No.: PCT/EP2014/078772
§ 371 (c)(1),
(2) Date: Sep. 27, 2016

(87) PCT Pub. No.: WO2015/149892
PCT Pub. Date: Oct. 8, 2015

(65) Prior Publication Data
US 2017/0021754 A1    Jan. 26, 2017

(30) Foreign Application Priority Data
Mar. 31, 2014   (DE) .................... 20 2014 101 510 U (51) Int. Cl.
*B60P 1/00* (2006.01)
*B60P 7/08* (2006.01)
(Continued)

(52) U.S. Cl.
CPC .................... *B60P 7/08* (2013.01); *B60P 1/02* (2013.01); *B60P 1/43* (2013.01); *B62D 53/005* (2013.01)

(58) Field of Classification Search
CPC . B65G 67/04; B65G 69/24; B60P 1/02; B60P 3/07; B60P 7/08; B60P 1/43; B62D 63/08
See application file for complete search history.

(56) References Cited

U.S. PATENT DOCUMENTS

| 8,235,642 B2 * | 8/2012 | Camaly ................ B62D 63/062 414/339 |
| 9,676,314 B2 * | 6/2017 | Neubauer ................. B60P 1/02 |
| 2016/0101948 A1 * | 4/2016 | Berghammer ............ B60P 1/02 414/349 |

FOREIGN PATENT DOCUMENTS

| DE | 202013102199 U1 | 8/2013 | |
| DE | 102012017838 A1 * | 3/2014 | ............. B62D 63/06 |

(Continued)

*Primary Examiner* — Kaitlin S Joerger
(74) *Attorney, Agent, or Firm* — The Webb Law Firm (57) ABSTRACT

A trailer-train trailer having a carrying frame for accommodating at least one material transport cart carried along in a trailer train, the carrying frame including a centrally arranged chassis having an axle, two wheels laterally supported on said axle, and an arrangement, for accommodating the material transport cart, is provided in front of and behind the chassis in a direction of travel. The arrangement for accommodating the material transport cart includes ascending and descending ramps for supporting the swiveling and/or fixed rollers of the trolley at least one material transport cart. A height-adjustable arrangement for locking the material transport cart may be arranged at the two lateral ends of the housing transversely to the direction of travel.

15 Claims, 11 Drawing Sheets

(51) Int. Cl.
*B60P 1/43* (2006.01)
*B60P 1/02* (2006.01)
*B62D 53/00* (2006.01)

(56) References Cited

FOREIGN PATENT DOCUMENTS

| | | | |
|---|---|---|---|
| DE | 102013008242 A1 * | 11/2014 | ................ B60P 1/02 |
| DE | 102014100865 A1 * | 7/2015 | ................ B60P 1/02 |
| EP | 1986883 | 11/2008 | |
| EP | 2808234 A1 * | 12/2014 | ........... B62B 5/0079 |
| EP | 2939908 A1 * | 11/2015 | ................ B60P 1/02 |
| WO | 2007096509 A1 | 8/2007 | |

* cited by examiner

TRAILER-TRAIN TRAILER WITH CARRYING FRAME FOR A MATERIAL TRANSPORT CART

CROSS REFERENCE TO RELATED APPLICATIONS

This application is a United States national phase of International Application No. PCT/EP2014/078772, filed Dec. 19, 2014, which claims the benefit of German Utility Patent Application No. DE 20 2014 101 510.8, filed Mar. 31, 2014. The disclosure of each of these documents is hereby incorporated in its entirety by reference.

BACKGROUND OF THE INVENTION

Field of the Invention

This invention relates to a trailer-train trailer with a carrying frame to accommodate at least one towed material transport cart (trolley).

Description of Related Art

The subject matter of EP 1 986 883 B1 is a handling device. The purpose of this device is to pull a load, such as a trolley, for example, laterally onto a trailer-train trailer. At the beginning of the loading movement, by means of curved skids, the trolley comes into the vicinity of two parallel chains on which the skids are supported as the trolley is pulled onto the trailer-train trailer. The chains, which follow a trapezoidal track, are thereby required to pick up the entire load of the trolley. To ensure that the steering and fixed rollers of the trolley are no longer in contact with the ground in its semi-mounted position, the trolley must be lifted very high by means of the ascending traction strand of the chain so that it can also be moved over the two tow bars of the trailer.

DE 20 2013 102 199.7 describes a trailer-train trailer with a carrying frame which, in an overhead view, is in the shape of an E, on the center carrier of which there is a gripper unit in the form of a circulating chain that holds the load. In this arrangement the two chains are installed in a housing that can be extended telescopically relative to the central carrier to grasp the trolley and pull it into the support frame.

SUMMARY OF THE INVENTION

The object of the invention is to make available a trailer train-trailer with a carrying frame for a trolley in which the means to hold the material transport trolley are supported by a device that relieves the weight in any position of the trolley. The solution to this task is described in the following disclosure.

The two ramps that extend the carrying frame of the trailer-train trailer toward the front and toward the rear in its longitudinal direction, accommodate its entire load in any position of the trolley as it is being slid on, during transport in the trailer train and during unloading of the trolley, because the steering and/or fixed rollers are supported on the two ramps.

In one development of the invention, the curved ramps each project from a side wall of a housing that covers the chassis, is open on the bottom, and has a roof that connects the two parallel side walls, whereby between the roof and the axle of the chassis there is a lifting device to adjust the height of the carrying frame.

The lifting device ensures that the two ramps are lifted up off the ground for transport in the trailer train. During the loading and unloading of the trolley, the lifting device lowers the housing with the two ramps until it is once again in contact with the ground, so that the respective trolley can be easily added to or released from the trailer train. This can be done easily so that the loading and unloading can be performed by hand.

It is particularly advantageous if on the two free ends of the housing, transverse to the direction of travel, there are means or an arrangement, the height of which can be adjusted, for the interlocking of the trolley that secures it in the semi-mounted position on the carrying frame and serves as a terminal stop as it is pulled onto the trailer train.

The means for the interlocking on each of the two lateral ends of the housing can include two pawls that can pivot around fixed hinge pins and are opposite each other on the lateral end in the direction of travel, whereby on the axle, in addition to one of the two pawls, a latch parallel to it is mounted so that it can move longitudinally relative to the pawl and is in an operative connection by means of a connecting rod with the opposite pawl on the other end.

According to an additional feature of the invention, means to pull the trolley on board as well as a gripper unit with a circulating chain are provided to make it unnecessary to manually push the trolley onto the trailer train.

BRIEF DESCRIPTION OF THE DRAWINGS

The invention is explained below with reference to the exemplary embodiments illustrated in the accompanying drawings, in which.

DETAILED DESCRIPTION

FIGS. 1-6 show a single-axle trailer-train trailer 10 with a carrying frame 12 to hold at least one trolley 14 carried in a trailer train. The trolley 14 includes a rectangular frame 16 with two parallel longitudinal spars 18 and transverse spars 20 connecting them. Steering and/or fixed rollers 22 are attached to both longitudinal spars 18 to allow the trolley 14 to travel. The frame 16 holds loads, such as pallets or wire mesh boxes, which are not shown here.

Figure 15:
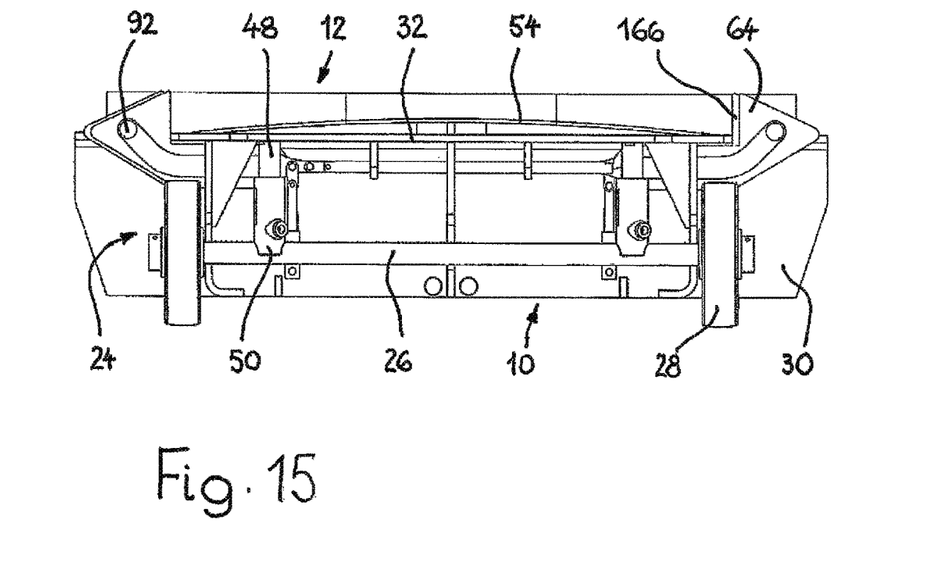
FIG. 15 is a side view of the trailer-train trailer in the raised position of the carrying frame.
Figure 16:
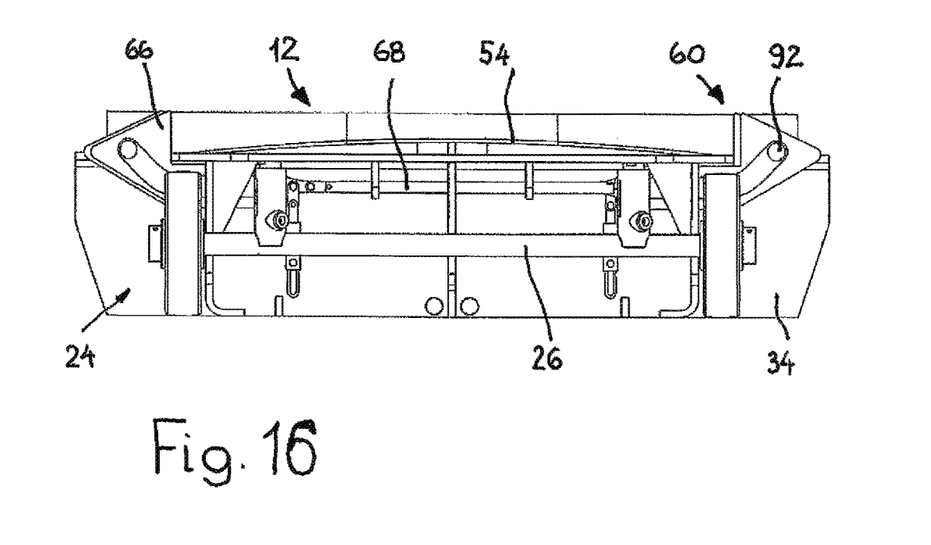
FIG. 16 is a sectional view of the trolley in the lowered position.

The carrying frame 12 of the trailer-train trailer 10, as known from EP 2 161 182 B1, has a centrally located chassis 24 with an axle 26 oriented transverse to the direction of travel, on both ends of which a freely rotatable wheel 28 is mounted (see also FIGS. 15 and 16). The chassis 24 is covered by a housing 30 that is open on the bottom and has a flat roof 32 oriented transverse to the direction of travel corresponding to the axle 26, wherein a side wall 34 projects downward from each of the two longitudinal sides of the flat roof 32 that run parallel to the axle 26.

The invention teaches that an ascending and descending ramp 42 is permanently attached to the carrier frame 12 in front of and behind the chassis 24 in the direction of travel f on the lower edge of the respective side wall 34 of the housing 30, which extends the housing 30 toward the front and toward the rear in the direction of travel f. Each ramp 42, in a plane parallel to the axle 26, has a cross-section in the form of a segmental arch, which makes it possible to manually push the trolley on board on both sides with the application of a small amount of force.

On the front and rear end of the ramps 42 in the direction of travel f, there is a yoke 44 that makes it possible to couple the trailer-train trailer 10 with an additional trailer 10 or a tractor vehicle.

Each ramp 42, on its free end 52 pointing away from the chassis 24 and parallel to it, has a guide rail 54 in the manner of a railing which, with the opposite guide rail 54 in the direction of travel f, forms a divergent opening on its free end 56, as a result of which a beveled insertion channel is formed that facilitates the correct insertion of the trolley 14 transverse to the direction of travel f.

Figure 11:
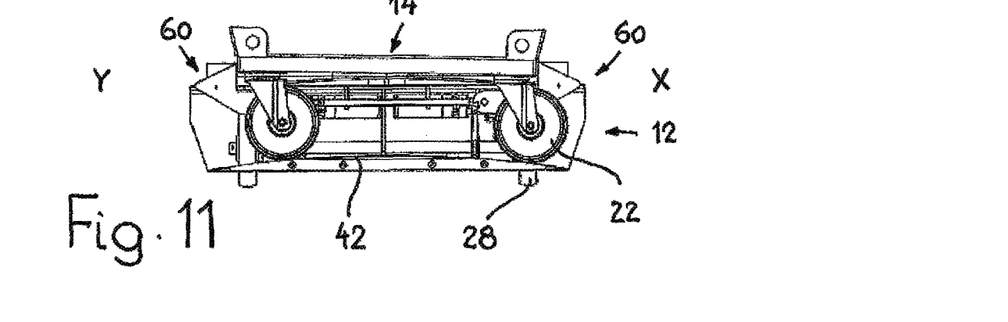

As shown in FIGS. 15 and 16, between the roof 32 of the housing 30 and the axle 26 of the chassis 24 there is a lifting device 50, known from EP 2 161 182, with a hydraulically, pneumatically or electrically operated piston rod 48 which is supported on the underside of the roof 32. By means of this lifting device 50, the entire carrying frame 12, together with the trolley 14, the rollers 22 of which sit on the ramps 42, can be lifted above the floor (see FIGS. 4, 11 and 15). In this raised position, the trailer-train trailer 10 can be moved in the train set.

In the vicinity of the two lateral ends 58 of the housing 30, transverse to the direction of travel f, there are adjustable means 60 (also referred to as an adjustable arrangement) for the interlocking of the trolley 14 on the carrying frame 12. These means, as illustrated in FIGS. 7-16 and 25-30, include pivoting pawls 64 in the form of stable, triangular plates that can pivot around fixed swivel pins 62 and face one another in pairs on the two lateral ends 58 in the direction of travel f. The swivel pins 62 run in the direction of travel f and are engaged in associated bearing plates 104 (FIGS. 25-27) that are fastened to the underside of the roof 32 of the housing 30. Next to each pawl 64 there is a latch 66 parallel to it having the same triangular shape or opposite it a latch 166.

Because these latches 66 and latches 166 do not have to absorb any load, they have a lower thickness than the pawls 64 at which the trolley abuts. Each latch 66 and latch 166 has a slot 70 that can be movably mounted on the stationary swivel pin 62 of the associated pawl 64, as well as a slot boring 76 into which the guide pins 74 projecting from the pawls 64 are engaged. In this manner the latches 66 and the latches 166 are movably guided in their longitudinal direction relative to the associated pawls 64 which can only rotate around the fixed swivel pins 62.

Figure 25:
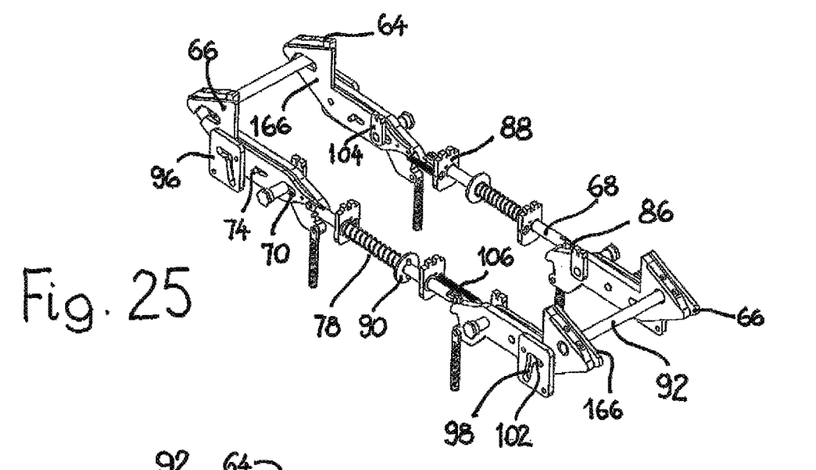
FIG. 25 is a view in perspective of the interlocking means in the closed position (trolley mounted)
Figure 26:
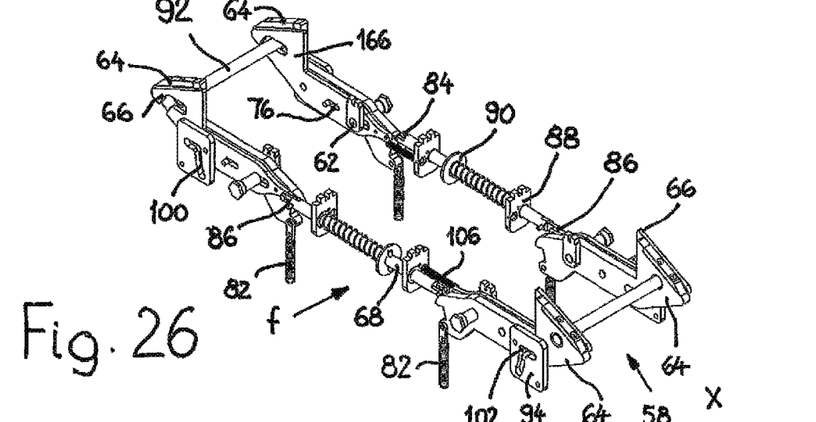
FIG. 26 shows the initial position of the interlocking means.
Figure 27:
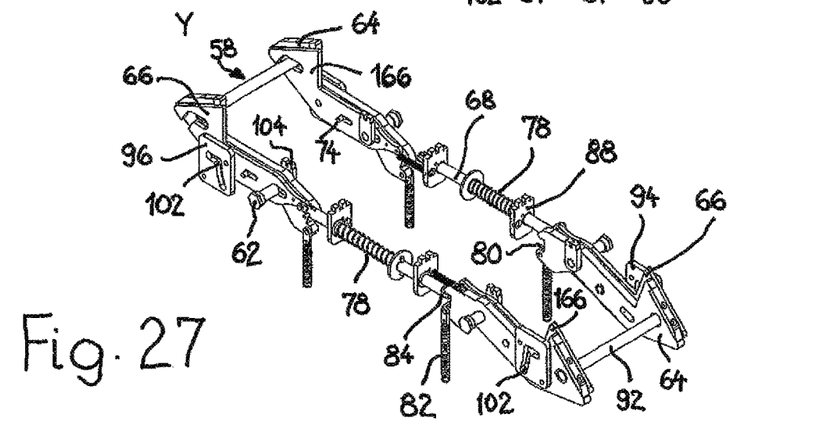
FIG. 27 shows the interlocking means in the opened position on the right side.

As shown in FIGS. 25-27, the two latches 66 are located on the outward facing side of the associated pawls 64 and are connected by means of a hinge pin 86 with a connecting rod 68 that extends transverse to the direction of travel f and is located in the housing 30 adjacent to each side wall 34 parallel to the central longitudinal axis of the housing 30. The two connecting rods 68 are each mounted in borings in two respective retaining plates 88 fastened in the housing 30 so that they can move longitudinally against the force of return springs 78 that are in the form of coil springs. They are placed on the connecting rods 68 and are supported on one hand on the retaining plates 88 and on the other hand on a supporting ring 90 which is permanently connected with the connecting rod 68.

Figure 22:
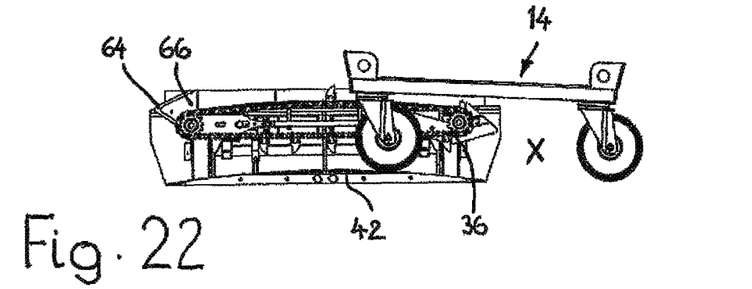
Figure 28:
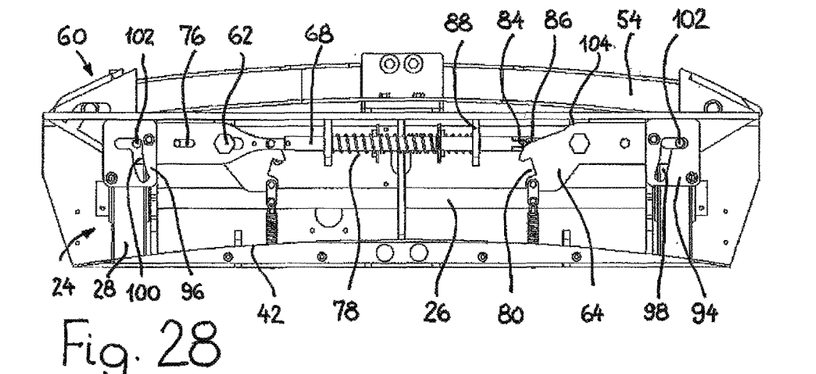
FIGS. 28-30 show the interlocking means in the positions illustrated in FIGS. 25-27.
Figure 29:
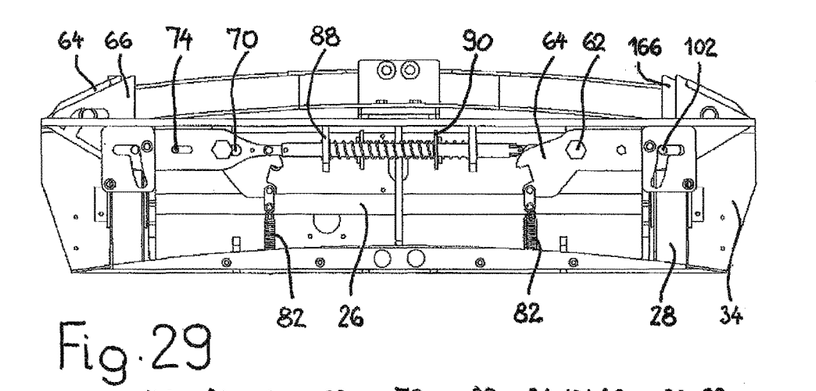

The free end 84 of the connecting rod 68 that is not connected by means of the hinge pin 86 with the latch 66, is engaged in a snap-fit mounting 80 of the facing pawl 64, to hold it in the pivoted release position (FIGS. 22 and 29). Because one pawl 64 of each pair lies in the vertical plane of the facing latch 66, in the pair of pawls on the opposite lateral end 58, on account of the crossover arrangement, the position of the pawl 64 and latch 66 or latch 166 is reversed. When the two latches 66 located diagonally opposite each other move longitudinally, they pull the free end 84 of the connected connecting rod 68 out of the snap-fit mounting 80 of the facing pawl 64, so that the pawls 64 and latches 66, 166 can move into their locking position as a result of the force of a tension spring 82 (FIGS. 25, 26 and 28, 29).

On the inside of each side wall 34 of the housing 30, there are two rocker plates 94, 96 (shown in FIGS. 25-30) with angle-shaped guide slots 98 and 100 respectively, into each of which a pin 102 that projects from the neighboring latch 66, 166 is engaged. Each guide slot 98, 100 includes a downward pointing section that transitions into a horizontal section parallel to the axle 26, which is bent toward the lateral end 58, so that during a horizontal movement of the latch 66 into the position illustrated in the right portion of FIG. 28, it prevents a tipping movement of the pawls 64, around the fixed swivel pin 62, as long as the pin 102 is engaged in the horizontal section of the guide slot 98 or 100. As noted above, each latch 66, 166 is connected with the associated pawl 64 by a guide pin 74 that can move in the slot boring 76 that acts as a guide slot of the latch 66 or 166 in the longitudinal direction of the connecting rod 68, so that both pawls and latches 64, 66 and 64, 166 respectively can be dynamically coupled with each other in terms of movement.

The two latches 166 are oriented parallel to the two latches 66 and, when the trolley executes a pushing movement, are pushed into the locking position illustrated in FIG. 28, in which the pin 102 is engaged in the horizontal section of the guide slot 98, and on this side X prevents a descent of the pawls 64 and latches 66, 166. The latches 166 are pulled by two tension springs 106 into their initial position (FIGS. 26 and 29), in which they project beyond the pawls 64 and in which their pin 102 is engaged in the horizontal segment of the guide slot 98. Therefore, from this initial position, the foot pedal 92 can be pushed alternately to both sides X and Y or a trolley can be pushed onto one of the two sides X, Y (see FIGS. 27 and 30).

Figure 1:
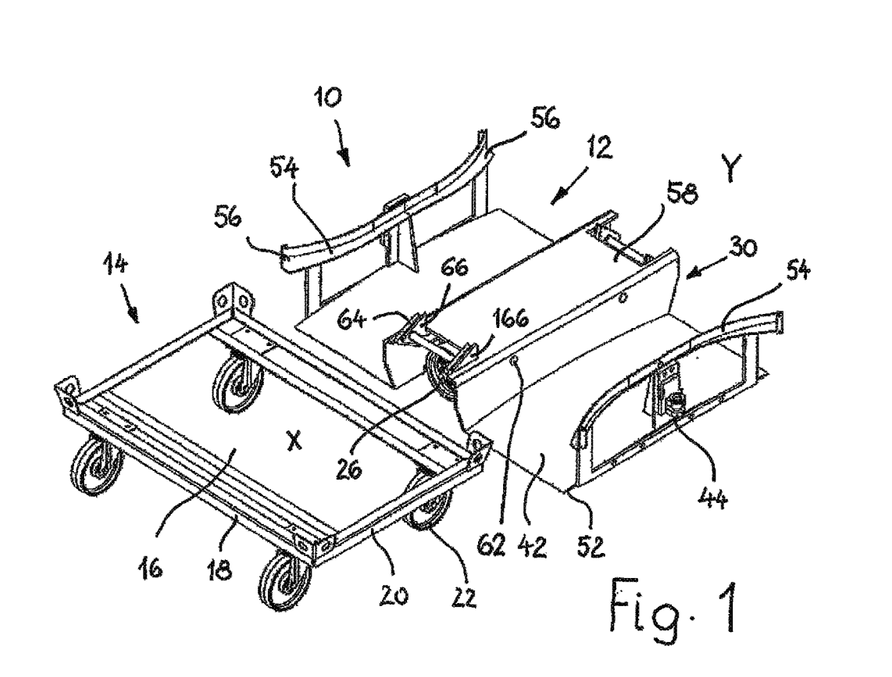
FIG. 1 is a perspective view, from diagonally above, of a trailer-train trailer at the beginning of the process of loading a trolley.
Figure 30:
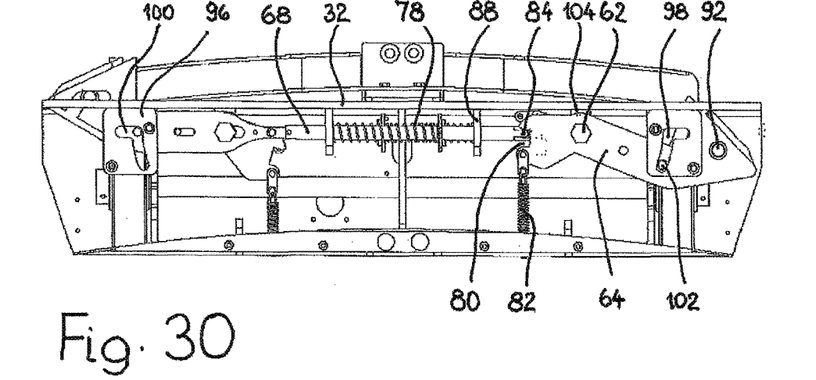

In the situation illustrated in FIG. 1, a trolley 14 is placed next to the carrying frame 12 of the trailer-train trailer 10, whereby on the left insertion side X, the pawls 64 and the latch 66 or latch 166 are extended; on the opposite side Y, the pawls 64 and the latches 66, 166 are retracted, i.e. tipped downward around the swivel pin 62, which corresponds to the position illustrated in FIGS. 27 and 30.

Figure 2:
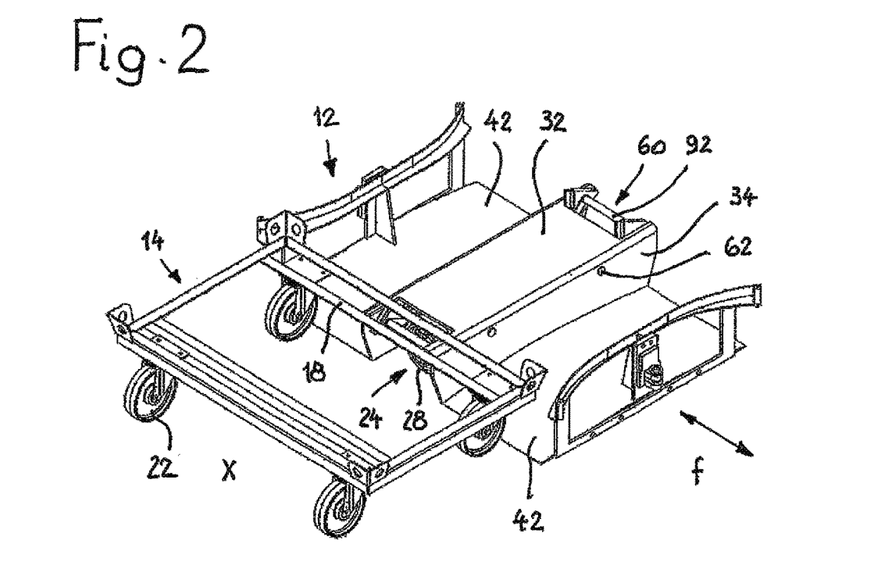
FIG. 2 is a perspective view corresponding to FIG. 1 during the manual insertion of the trolley.
Figure 3:
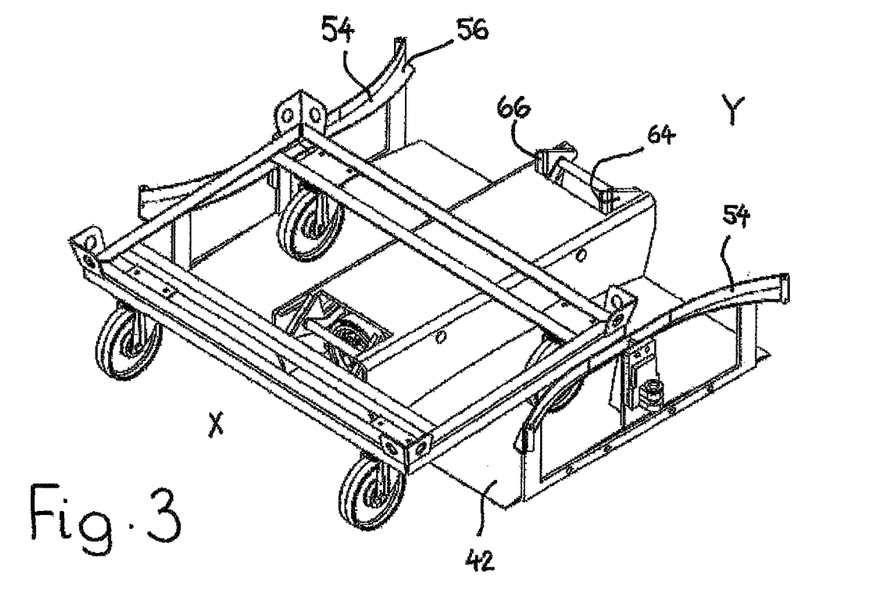
FIG. 3 shows the trolley during insertion toward the center position.
Figure 4:
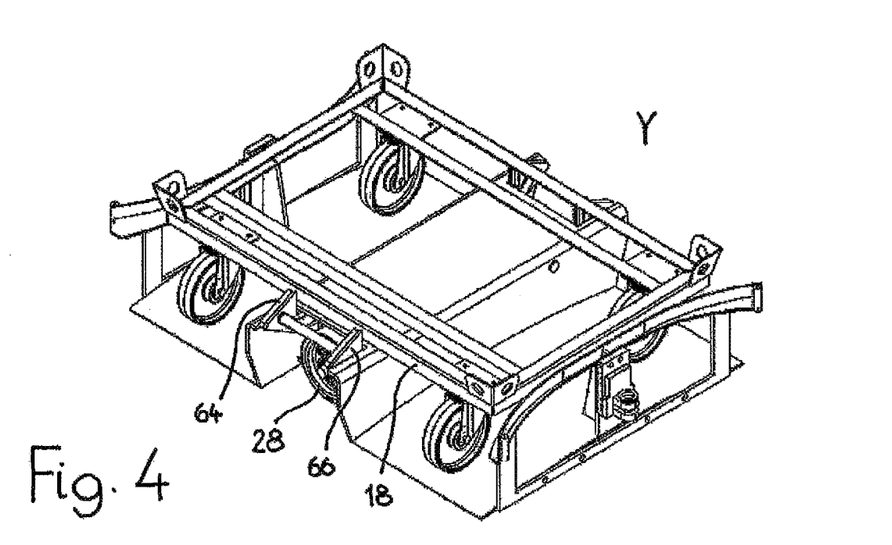
FIG. 4 shows the trailer-train trailer with a mounted trolley in the central position.
Figure 5:
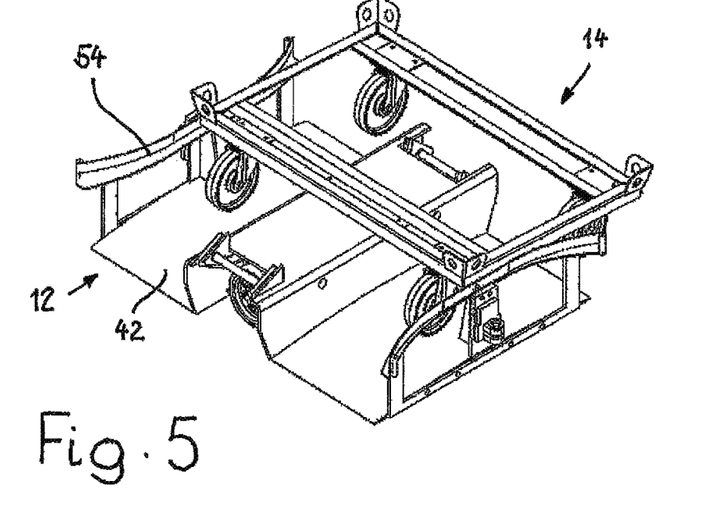
FIG. 5 shows the trolley being pulled out of the trailer-train trailer.
Figure 6:
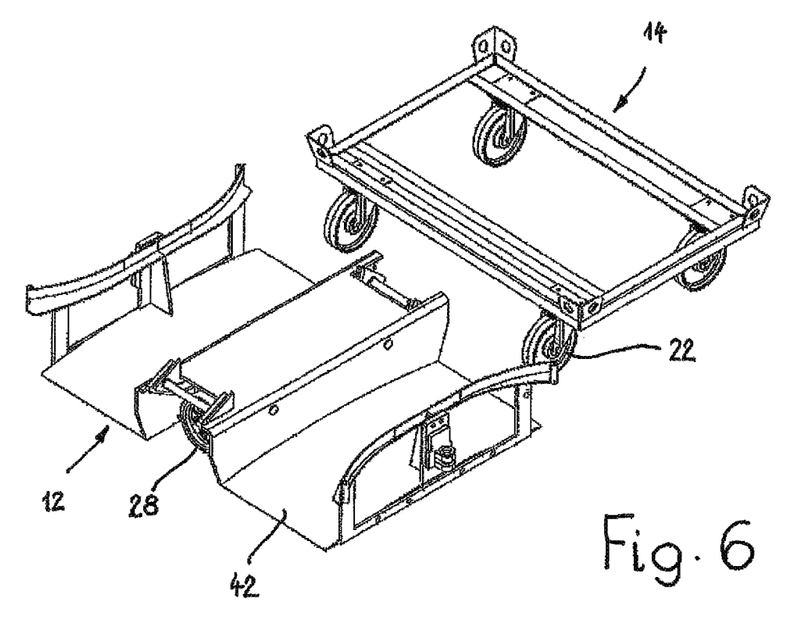
FIG. 6 shows the trailer-train trailer after it has been pulled out of the trolley.
Figure 7:
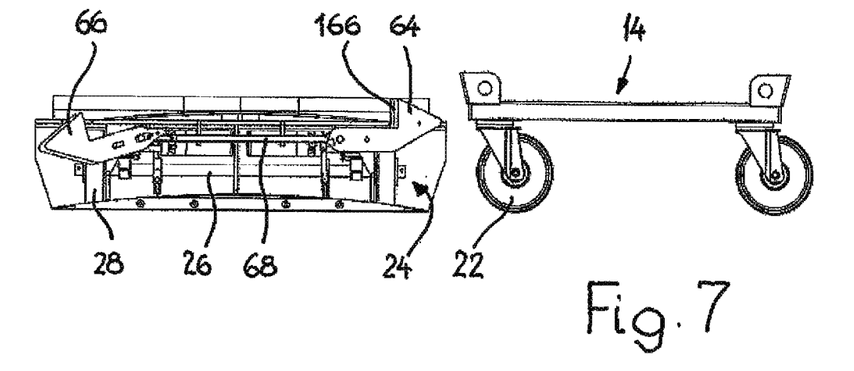
FIGS. 7-14 are side views of the trailer-train trailer during insertion and the ejection of the trolley from the other side.
Figure 8:
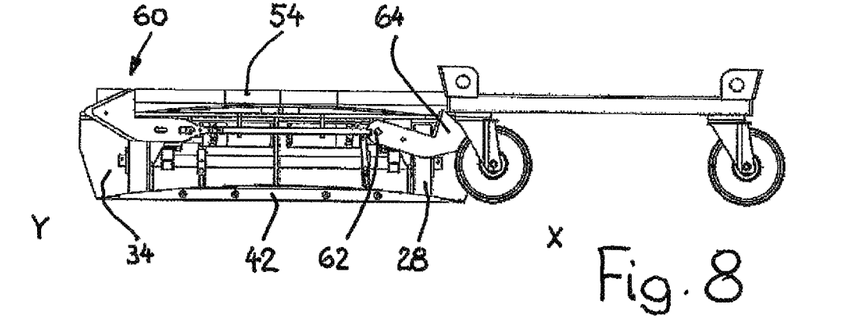
Figure 9:
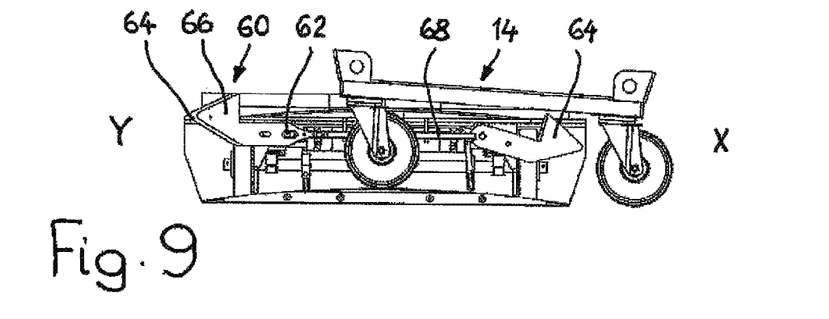
Figure 10:
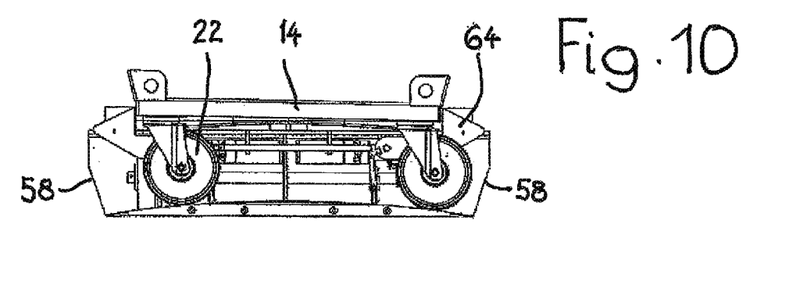

As shown in FIGS. 2 and 8, as soon as the longitudinal spar 18 of the trolley 14 moves over the pawls 64 on the entry side X, these pawls 64 are pressed downward, which is possible in the initial position illustrated in FIG. 26, because the pin 102 can "descend" downward into the vertical section of the guide slot 98, as a result of which the connecting rod 68 simultaneously moves the two facing pawl pairs 64, 66 or 166 opposite on the side Y out of the release position illustrated in FIG. 7 into the locking position in FIGS. 8 and 9. Then, in the position illustrated in FIGS. 4 and 10, if the forward longitudinal spar 18 in the insertion direction of the trolley 14 and the facing side Y comes into contact against the two latches 66, 166 that project beyond the pawls 64, the pin 102 in the horizontal section of the guide slot 98 or 100 is pushed so that it cannot descend into its vertical section. The latch 66 projecting laterally toward the insertion side X beyond the pawl 64 thereby pulls the connecting rod 68 and with it the pawl 64 on the insertion side into their locked position described above (FIGS. 25 and 26), so that the trolley 14, as illustrated in FIGS. 4 and 10, is secured in its central position on the carrying frame 12.

Figure 12:
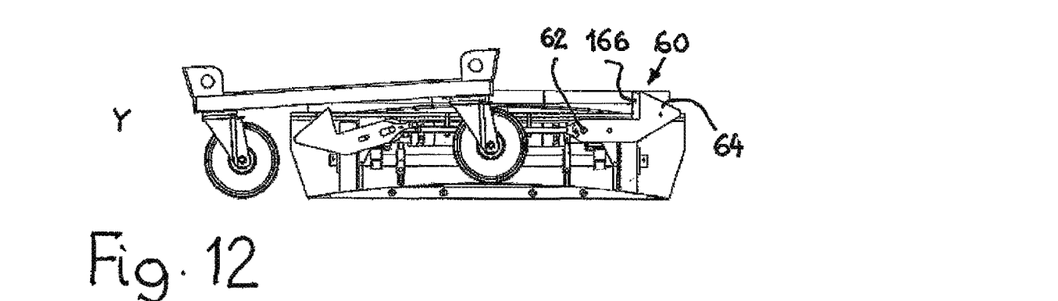
Figure 13:
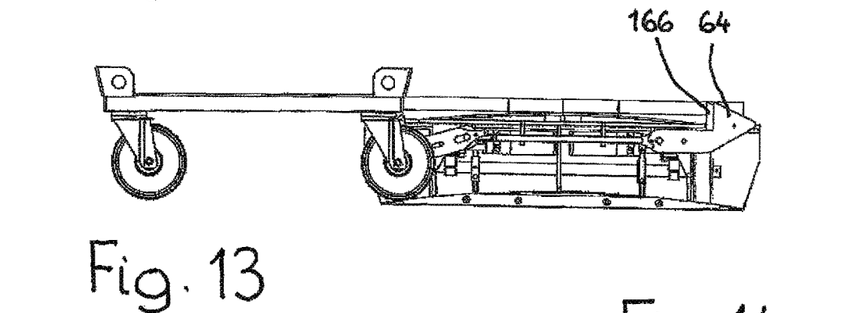
Figure 14:
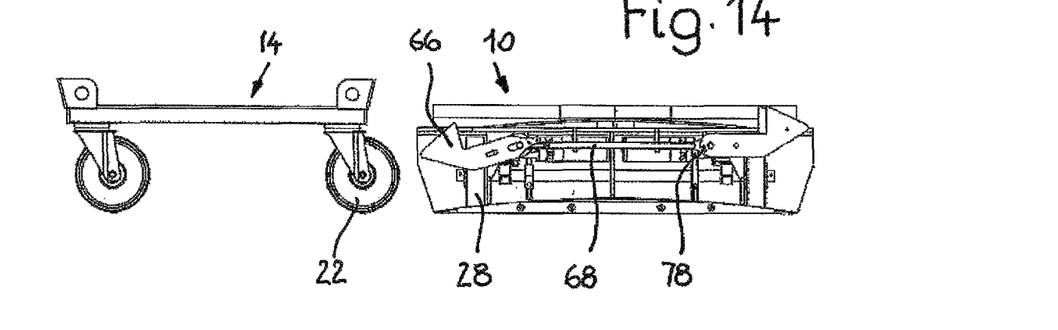
Figure 24:
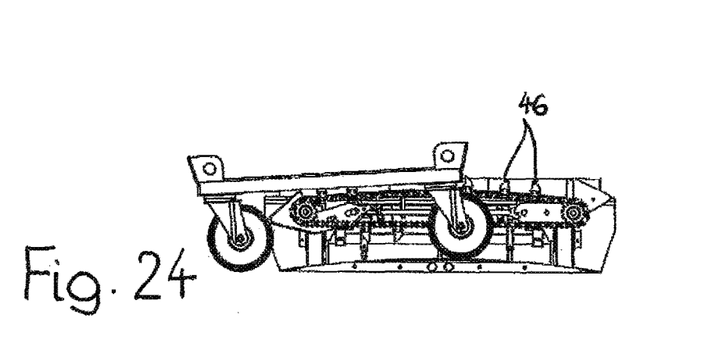

To release the trolley 14 for unloading, on the selected exit side Y, by means of the actuation of the foot pedal 92 located there, the corresponding pawls 64 and latch 66 or latch 166 are lowered (see FIG. 12, left side, and FIG. 24). The facing pawls 64 and latches 66, 166 thereby remain in their extended locked position. In this position the free end 84 of the connecting rod 68 locks the pawl 64 in the facing snap-fit mounting 80 and interlocks it in the opened position in which it is tipped downward around the swivel pin 62 (FIG. 27).

In this position, as shown in FIGS. 7-10, a trolley 14 can be pushed in until its forward end in the insertion direction comes into contact with the longitudinal spar 18 present there against the facing pawl 64 or latch 66, 166 that projects beyond the pawl 64. The free end 84 of the connecting rod 68 is thereby pulled out of the snap-fit mounting 80 on the other side (FIGS. 25 and 26, as well as FIGS. 28 and 29), so that as a result of the force of the tension spring 82 suspended in the pawl 64, this pawl 64 as well as the latch 66 or 166 coupled with it are pivoted upward parallel to one another into their closed position (FIGS. 25 and 26, as well as FIGS. 28 and 29). The trolley 14 is thereby secured for transport.

So that the trolley 14 can be pulled out again toward the other side (in FIG. 12 toward the Y side) by means of the foot pedal 92 on this side, the latches 66, 166 and pawl 64 are pivoted downward (analogous to FIG. 30, right), so that on this side the return pressure spring 78 pushes the connecting rod 68 with its free end 84 into the snap-fit mounting 80, and on this side all the pawls 64 and latches 66, 166 that are coupled to one another by means of the foot pedal 92 remain in their open position while the trolley 14 is pushed out. The four pawls 64 and latches 66, 166 on this side snap the free end 84 of the connecting rod 68 into its snap-fit mounting 80 to ensure that all the pawls 64, and latches 66, 166 remain in their open position while the trolley 14 is pushed out.

If, instead, the four pawls 64, and latches 66, 166 on the other side X are to be placed in the release position, they are actuated by pushing down on the foot pedal 92 analogously by means of the opposite connecting rod 68.

The hinge pin 86 between the connecting rod 68 and the pawl 64 ensures that the pivoting motion of the pawls 64 is transformed into a linear movement of the connecting rod 68.

The preceding description shows that on account of the location of the adjustable means 60 on both lateral ends 58 of the housing 30, the invention ensures that the pawls 64 on at least one of the two ends 58 are always pivoted outward and upward so that the trolley 14, at the end of its insertion travel, can be held. Even if it is inserted with a great deal of momentum, the trolley 14 cannot roll out via the exit ramp 42. The locking latches 166 have the task of preventing or making possible a descent of the latches 66, depending on the position of the pin 102.

In the exemplary embodiment illustrated in FIGS. 17-24, a gripper unit 47 equipped with two parallel chains 38 is provided to assist the pulling-in of the trolley 14. Drive or pulley rollers 36 that are connected with a motor (not shown) for an endless circulating chain 38 are mounted on each of the two parallel side walls 34 of the housing 30, whereby the lower guide roller 36' lies higher than the two outer drive or guide rollers 36. In this manner, the upper strand 40 of the chain 38 has a hemispherical-shaped path that corresponds to the curved shape of the ramp 42 located underneath it.

Figure 17:
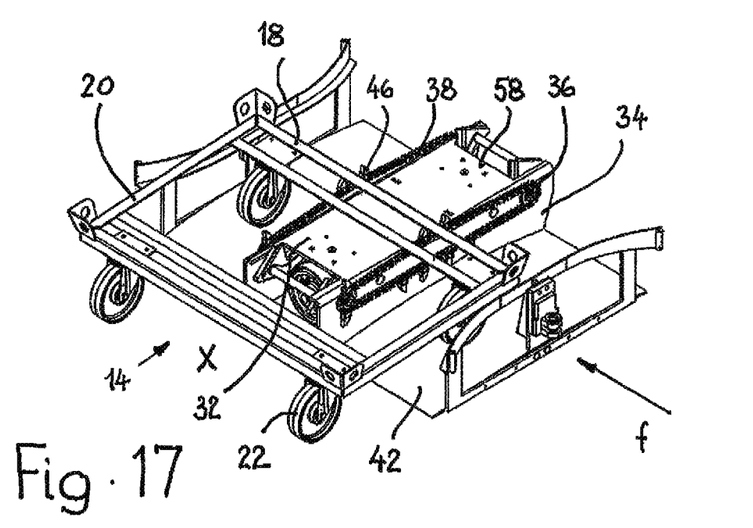
FIG. 17 is a view of one variant of the trailer-train trailer with the chain gripper unit during the engagement of a trolley in front of it and to the left.

Projecting from each chain 38 are gripping fingers 46, the purpose of which, as the trolley 14 is pulled on, is to grab a longitudinal spar 18 of the frame 16 (see FIG. 17). Because the gripping fingers 46 are arranged in pairs, they grip the longitudinal spar 18 from both sides and therefore provide a good hold on the two parallel chains 38 which are driven synchronously.

Figure 18:
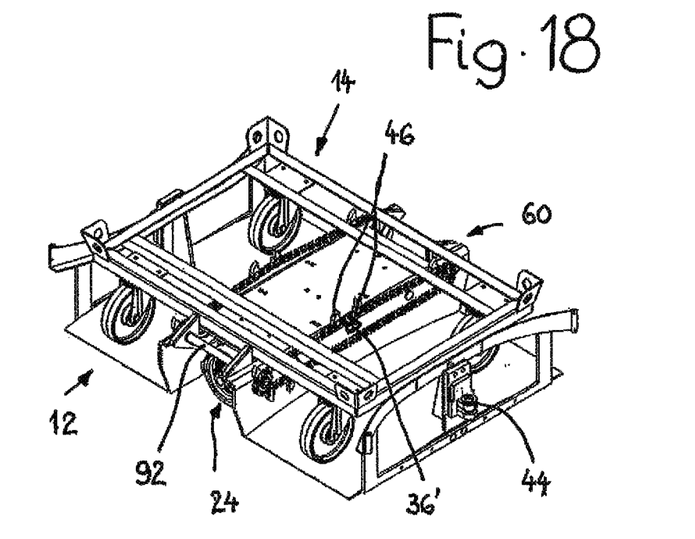
FIG. 18 shows the trailer-train trailer in FIG. 17 in the mounted position of the trolley.
Figure 19:
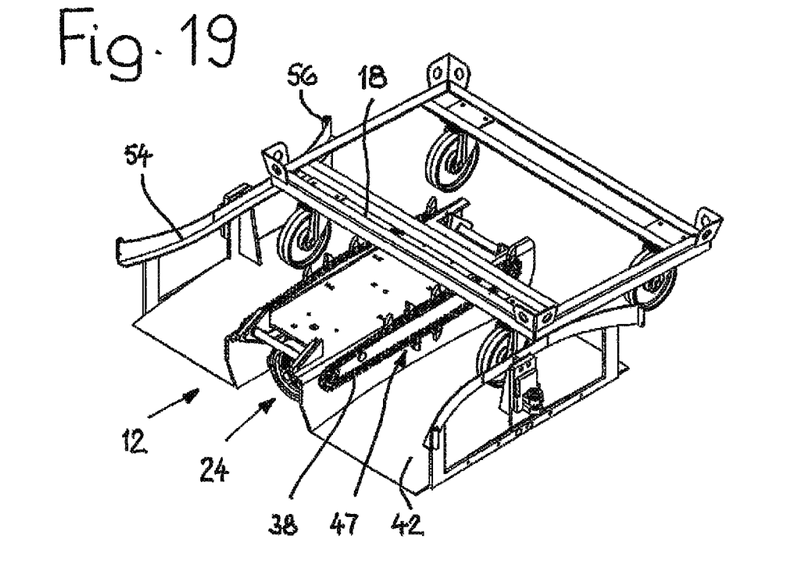
FIGS. 19 and 20 show the ejection positions of the trolley from left to right.
Figure 20:
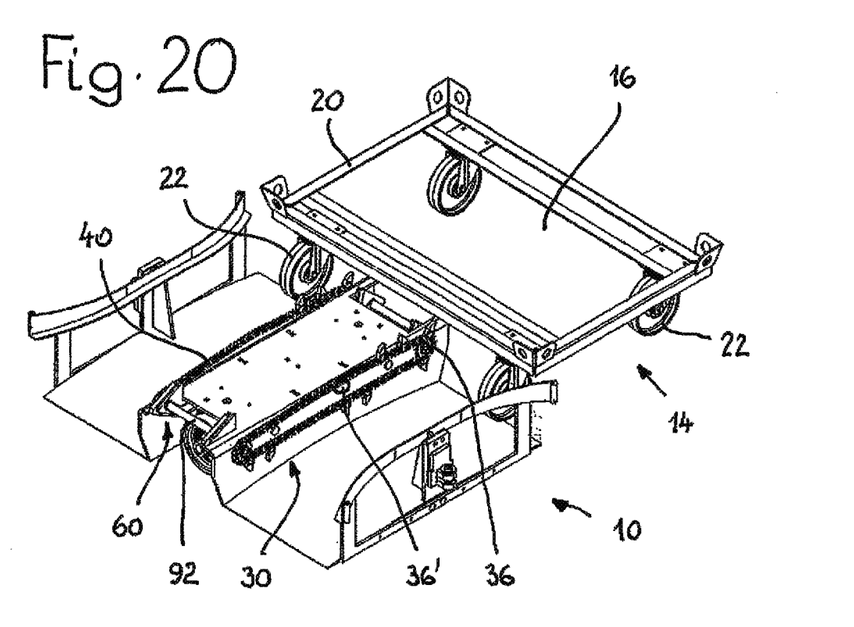
Figure 21:
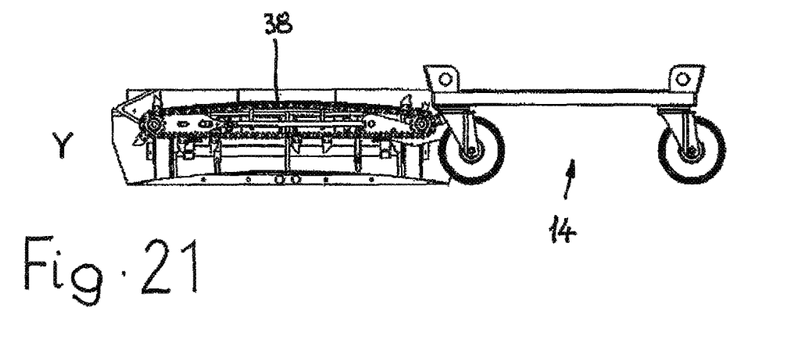
FIGS. 21-24 are side views of the trailer-train trailer in the positions illustrated in FIGS. 17-20 but during insertion from right to left.
Figure 23:
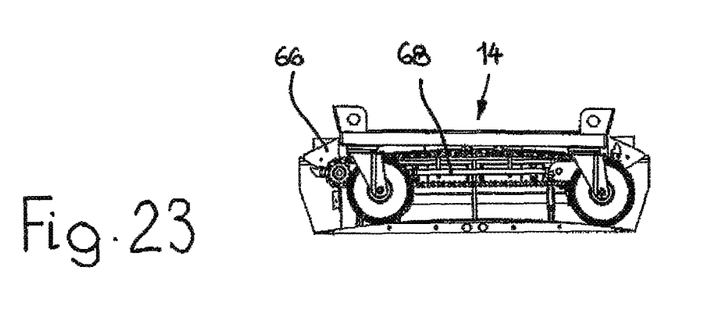

FIGS. 17 and 21 show the position of a trailer-train trailer 10 with the trolley 14 located laterally next to it shortly before two of the gripping fingers 46 of the chain 38 grip the longitudinal spar 18 of the trolley 14, to then pull it as illustrated in FIGS. 18 and 22 with the two forward rollers 22 in the direction of movement onto the two ascending ramps 42 in the shape of a segmented arch. In FIGS. 18 and 23, the trolley 14 has reached its center position, so that then, as illustrated in FIG. 15, the carrying frame 12 together with the trolley 14 can be lifted by means of the lifting device 50. When the trailer-train trailer 10 has reached its intended position, as illustrated in FIG. 16, the carrier frame 12 is once again lowered so that the trolley 14 can be removed by means of the chain 38 via its rollers 22 to one or the other side of the trailer-train trailer 10.

The chain drive, on each side, has two sensors (not shown), such as photoelectric sensors, for example, by means of which the parallelism of the trolley 14 can be checked. Once this check has been performed, a release signal for the chain drive is generated, as a result of which is ensured that the two chains 38 pull the trolley 14 onto the carrier frame 12 in the correct, properly aligned position.

The invention claimed is:
1. A trailer-train trailer with a carrying frame to hold at least one material transport cart carried in a trailer train with steering and/or fixed rollers, the carrying frame comprising a centrally located chassis with an axle, two wheels mounted laterally on the axle, and, in a direction of travel forward and aft of the chassis, an arrangement for accommodating the at least one material transport cart, the arrangement including ascending and descending ramps to directly support the steering and/or fixed rollers of the at least one material transport cart.

2. The trailer-train trailer according to claim 1, wherein the two ramps have a cross-sectional profile in a shape of a segmented arch in a plane parallel to the axle.

3. The trailer-train trailer according to claim 2, wherein the segmented arched ramps each protrude from respective vertical side walls, parallel to the axle, of a housing that is open on a bottom and covers the chassis and has a roof connecting the two vertical sidewalls, wherein there is a lifting device positioned between the roof and the axle of the chassis to adjust the height of the carrying frame.

4. The trailer-train trailer according to claim 3, wherein, on two lateral ends of the housing, there is a vertically adjustable arrangement transverse to the direction of travel for an interlocking of the at least one material transport cart.

5. The trailer-train trailer according to claim 4, wherein the adjustable arrangement for interlocking on each of the two lateral ends of the housing comprises two pawls that pivot around a fixed swivel pin, that are opposite one another on the lateral ends in the direction of travel, wherein, next to one of the two pawls, a first latch parallel to the pawl is mounted on the swivel pin so that the first latch moves longitudinally relative to the pawl, and is in an operative connection by means of a connecting rod with the opposite pawl on the other lateral end.

6. The trailer-train trailer according to claim 5, wherein, next to the other of the two pawls, a second latch is mounted on the swivel pin so that the second latch moves longitudinally relative to the pawl against a force of a tension spring.

7. The trailer-train trailer according to claim 6, wherein the first latch and second latch each have a slot that is mounted so that the latches can move on the swivel pin, while a pin projecting from the pawl located next to the respective latch engages in a slot boring that acts as a guide slot of the associated latch.

8. The trailer-train trailer according to claim 5, wherein each of the two connecting rods is coupled with one end by a hinged coupling to the first latch, while the connecting rod's opposite, free end is engaged in a form-fitting manner in the interlocking position in a force of a spring in a seat of the associated pawl.

9. The trailer-train trailer according to claim 6, wherein, associated with each latch, there is a rocker plate fastened in the housing with an angular guide slot including a downward-directed segment and a horizontal segment bent toward the lateral end, in which a pin that projects from the neighboring latch engages.

10. The trailer-train trailer according to claim 1, wherein a guide rail is attached to each ascending and descending ramp on the ramp's free edge pointing away from the chassis and parallel to the chassis.

11. The trailer-train trailer according to claim 10, wherein each guide rail diverges toward a free end to form an entry bevel.

12. The trailer-train trailer according to claim 1, wherein the arrangement for accommodating the at least one material transport cart includes a gripper unit that moves transverse to the direction of travel with two circulating chains, one chain strand ascending toward a longitudinal center axis of the trailer-train trailer and descending after the longitudinal center axis of the trailer-train trailer, wherein a hemispherical path of the chain strand of each chain corresponds to a curved shape of the ramp attached below the chain.

13. The trailer-train trailer according to claim 12, wherein gripper fingers project from the chain to grasp and hold a frame part of the at least one material transport cart.

14. The trailer-train trailer according to claim 13, wherein drive rollers and guide rollers for the chain strand of the chain are mounted on side walls of a housing.

15. The trailer-train trailer according to claim 1, wherein a yoke is attached on a leading and trailing end of the ramps in the direction of travel for coupling with an additional trailer-train trailer or a tractor vehicle.

* * * * *